J. E. FINLEY.
Churn-Dasher.
No. 205,740. Patented July 9, 1878.
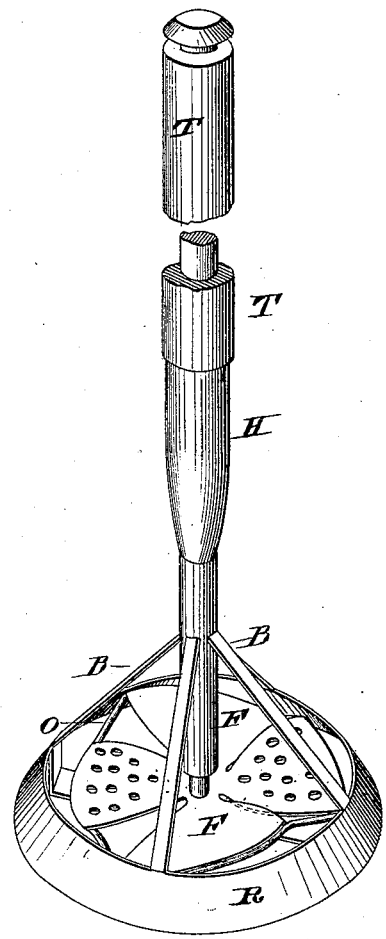
Attest.
J. S. Galloway
J. E. Frost
Inventor.
John E Finley

UNITED STATES PATENT OFFICE.

JOHN E. FINLEY, OF MEMPHIS, TENNESSEE.

IMPROVEMENT IN CHURN-DASHERS.

Specification forming part of Letters Patent No. 205,740, dated July 9, 1878; application filed January 28, 1878.

*To all whom it may concern:*

Be it known that I, JOHN E. FINLEY, of Memphis, of the county of Shelby and State of Tennessee, have invented a new and useful Improvement in Churn-Dashers, of which the following is a specification:

The object of my invention is to provide a churn-dasher easily operated in any of the ordinary upright churn-tubs, and one that will hasten the operation of butter-making.

My invention consists in fastening upon the sleeved staff propeller-blades, encircled by a a rim slanting at an angle of about forty-five degrees, as herein described.

The invention relates to placing upon a staff or handle a propeller-shaped wheel, with the alternate flanges perforated, revolving upon the staff or handle, with a wire encircling the wheel, while a rim with braces, extending to the handle or staff, holds the rim in place, and also in a revolving thimble on the upper end of the staff, to allow the handle to turn in the hand.

In the accompanying drawing, which is a perspective view, H represents the handle or staff; T, thimble; B B, braces. O is a wire; F F, propeller-shaped wheel. G is a brace across the bottom of the dasher.

The operation of the device is as follows: Place the dasher in the ordinary churn-tub, in which the milk or cream has been placed. Take hold of the staff at the thimble T. Raise the hand up and down, when the propeller-shaped wheel F F will revolve rapidly through the cream. The rim R is set at an angle of thirty to forty-five degrees, by which means the cream is forced through the revolving wheel, which has two of its flanges perforated in such a manner as to break the globules containing the butter. The wire which encircles the wheel makes the wheel firm and durable, while the braces B B to the rim R hold the rim securely in place, and act at the same time with force upon the cream, and in this way, with the sharp edges of the rim R, help to hasten the operation of butter-making.

I do not claim, broadly, a propeller-shaped wheel for the use of a churn-dasher; but

What I claim as my invention, and desire to secure by Letters Patent, is—

Jointly with the propeller-blades and the dasher-shaft, the conical rim R, connected to the shaft, substantially as described.

JOHN E. FINLEY.

Attest:
J. S. GALLOWAY,
J. E. FROST.